(12) United States Patent  
Yamamoto et al.

(10) Patent No.: US 7,539,731 B2  
(45) Date of Patent: May 26, 2009

(54) METHOD FOR AUTOMATICALLY SENDING MESSAGES AT DESIRED APPROPRIATE TIMINGS AND AN AUTOMATIC MESSAGE SENDING SERVICE SYSTEM

(75) Inventors: Hirohisa Yamamoto, Minato-ku (JP); Kenichi Okazaki, Minato-ku (JP); Tsutomu Iitsuka, Minato-ku (JP)

(73) Assignee: NEC Corporation, Tokyo (JP)

( * ) Notice: Subject to any disclaimer, the term of this patent is extended or adjusted under 35 U.S.C. 154(b) by 947 days.

(21) Appl. No.: 10/889,095

(22) Filed: Jul. 13, 2004

(65) Prior Publication Data

US 2005/0013291 A1    Jan. 20, 2005

(30) Foreign Application Priority Data

Jul. 14, 2003    (JP)    ............... 2003-274189

(51) Int. Cl.
*G06F 15/16*    (2006.01)
(52) U.S. Cl. ............... 709/206; 379/93.24; 455/466
(58) Field of Classification Search ............... 709/206, 709/228; 379/201.1; 370/352
See application file for complete search history.

(56) References Cited

U.S. PATENT DOCUMENTS 7,227,937 B1 *  6/2007  Yoakum et al. ........ 379/201.01
7,299,286 B2 * 11/2007  Ramsayer et al. .......... 709/228

2002/0019850 A1 *  2/2002  Nakamura ................ 709/206
2004/0073614 A1 *  4/2004  Blohm .................... 709/206
2004/0161080 A1 *  8/2004  Digate et al. ............ 379/88.17

FOREIGN PATENT DOCUMENTS

| JP | 58-196754 A | 11/1983 |
| JP | 4-43751 A | 2/1992 |
| JP | 10-42086 A | 2/1998 |
| JP | H10-162033 A | 6/1998 |
| JP | 10-224474 A | 8/1998 |
| JP | 2000-99442 A | 4/2000 |
| JP | 2000-184066 A | 6/2000 |
| JP | 2001-53885 A | 2/2001 |
| JP | 2001-186562 A | 7/2001 |
| JP | 2002-290563 A | 10/2002 |
| JP | 2002-315053 A | 10/2002 |

* cited by examiner

*Primary Examiner*—Fan Tsang
*Assistant Examiner*—Simon King
(74) *Attorney, Agent, or Firm*—Sughrue Mion, PLLC

(57) ABSTRACT

A sender of a message uses a sender's portable telephone device to register, by way of a communication network, to a service agent: user's information, communication partner information, sending conditions, and a message. The service agent monitors whether the sending conditions are met, and when the sending conditions have been satisfied, executes processing to send the entered message to the receiver's portable telephone device of the communication partner that has been registered. The sending conditions include conditions relating to presence information that the communication partner can always access by way of a communication network through the communication partner's own communication terminal.

18 Claims, 6 Drawing Sheets

METHOD FOR AUTOMATICALLY SENDING MESSAGES AT DESIRED APPROPRIATE TIMINGS AND AN AUTOMATIC MESSAGE SENDING SERVICE SYSTEM

BACKGROUND OF THE INVENTION

1. Field of the Invention

The present invention relates to a method for automatically sending messages to designated transmission destinations by way of a communication network, and to a service system for this method.

2. Description of the Related Art

In communication by, for example, telephone or email, the sender cannot know the conditions under which the communication partner receives a message. A communication partner may not be in or may be occupied with other business and thus unable to directly see or hear a message. Alternatively, a message may be sent that is not appropriate for the communication partner's situation, such as when a private message is sent during work hours. In order to avoid such situations, the sender of a message must check the communication partner's schedule in advance, infer the partner's situation, and consider the time for sending a message.

In recent years, however, a presence information service is known as one information service by which information indicating a user's situation, such as whether the user is at work or the current location of the user, is disclosed in real time on a network by way of each of the communication terminals of a plurality of users so that people such as acquaintances of the user can check the user's current circumstances. By referring to this presence information, senders can more accurately gauge the situation of a communication partner. In the prior art, when a sender wished to consider the communication partner's circumstances and then send a message by telephone or email at an appropriate time, the sender was required to wait for the arrival of an appropriate time as inferred from the schedule of the communication partner and then perform transmission operations, or to monitor presence information and then perform transmission operations when the circumstances appeared suitable for sending the message. However, waiting for a communication partner's circumstances to reach a suitable state to send a message involved considerable time and trouble for the sender. In addition, a sender's circumstances are also subject to changes, and not only is performing transmission operations at an appropriate time difficult in some cases, but it is also possible for a sender to forget to transmit.

One means that can be considered for solving these problems involves the use of a device that monitors a communication partner's circumstances and then transmits a message when conditions that have been set are satisfied. As an example of the prior art that is relevant to this solution, a device is disclosed in Japanese Patent Laid-Open Publication No.162033/98 in which a mobile terminal is provided with a mechanism for measuring the time, location, atmospheric pressure, and temperature, and in which a device sends messages to mobile terminals that have been designated beforehand when the state of the mobile terminal as measured by this mechanism attains a set state. Japanese Patent Laid-Open Publication No.2002-315053 also discloses a mobile communication system that detects the current time and the location of a mobile communication terminal and that transmits messages when the time or location meets set conditions.

Nevertheless, the devices of the prior art that are disclosed in Japanese Patent Laid-Open Publication No.162033/98 and Japanese Patent Laid-Open Publication No. 2002-315053 are not always able to adequately meet the particular demands of practicality. For example, a sender who wishes to send a message that relates to a private matter to a transmission partner after the partner finishes work, may encounter difficulties in specifying the appropriate transmission time by merely setting the time or general location of the transmission partner.

It is thus the object of the present invention to provide an automatic message sending method and a service system for this method that allow transmission of a message by telephone or email at an appropriate time considering the state of a transmission partner without requiring the sender to wait for an appropriate time for sending the message. It is another object of the present invention to provide an automatic message sending method and service system for this method that can be variously applied, for example, as an alarm that reports the attainment of designated states in various situations of daily life.

SUMMARY OF THE INVENTION

The present invention for achieving the above-described objects relates to a method for sending by computer messages that have been registered in the computer by a sender by way of a communication network to communication terminals that have been registered in the computer by the sender when sending conditions that have been registered by the sender in the computer have been satisfied. As the sending conditions in the method of the present invention, conditions are used that include a condition in which presence information that can always be obtained by way of a communication network through communication terminals that have been registered in a computer by the sender attains a prescribed state. In order to automatically send messages under this type of sending conditions, the method of the present invention includes steps of: acquiring presence information by way of a communication network; referring to the presence information that has been acquired to monitor whether the sending conditions have been satisfied; and sending the messages when the sending conditions have been satisfied.

This automatic message sending method, through the sender's registration of sending conditions in a computer, enables the subsequent transmission of messages when the conditions have been satisfied without requiring the sender him or herself to monitor whether the sending conditions have been satisfied. The use of presence information for monitoring the sending conditions allows precise setting of the times for sending messages, such as when a transmission partner has finished work.

The messages that are transmitted and the sending conditions can be acquired by the computer from the communication terminal of the sender by way of a communication network. Accordingly, a sender is able to perform the registration operations from a communication terminal such as his or her own portable telephone, whereby the convenience of the method is enhanced.

The sending conditions can be composite conditions that are a plurality of conditions, whereby, for example, both a time condition and the condition of presence information must be satisfied. Accordingly, the time for sending a message can be more precisely and accurately set.

In the automatic message sending method of the present invention, there are cases in which the registered sending conditions can no longer be satisfied, such as when conditions have been set such that the presence information attains a prescribed state within a prescribed time interval, but the presence information does not attain the prescribed state even though the prescribed time interval has passed. In such cases, the registration of messages can be automatically deleted by the computer. In this way, the area for registration in storage devices that are attached to the computer is not wasted and the continuation of a pointless monitoring process can be avoided.

In addition, a plurality of communication terminals can be registered as the communication terminals to which messages are sent. This provision increases the variations of the state of use of automatic message sending. For example messages may be sent to the sender's own portable telephone device when the messages are sent to enable confirmation that the messages have been sent.

The automatic message sending service system of the present invention can be realized by an information processing device such as a work station server that is equipped with a computer and a means for communicating by way of a communication network.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
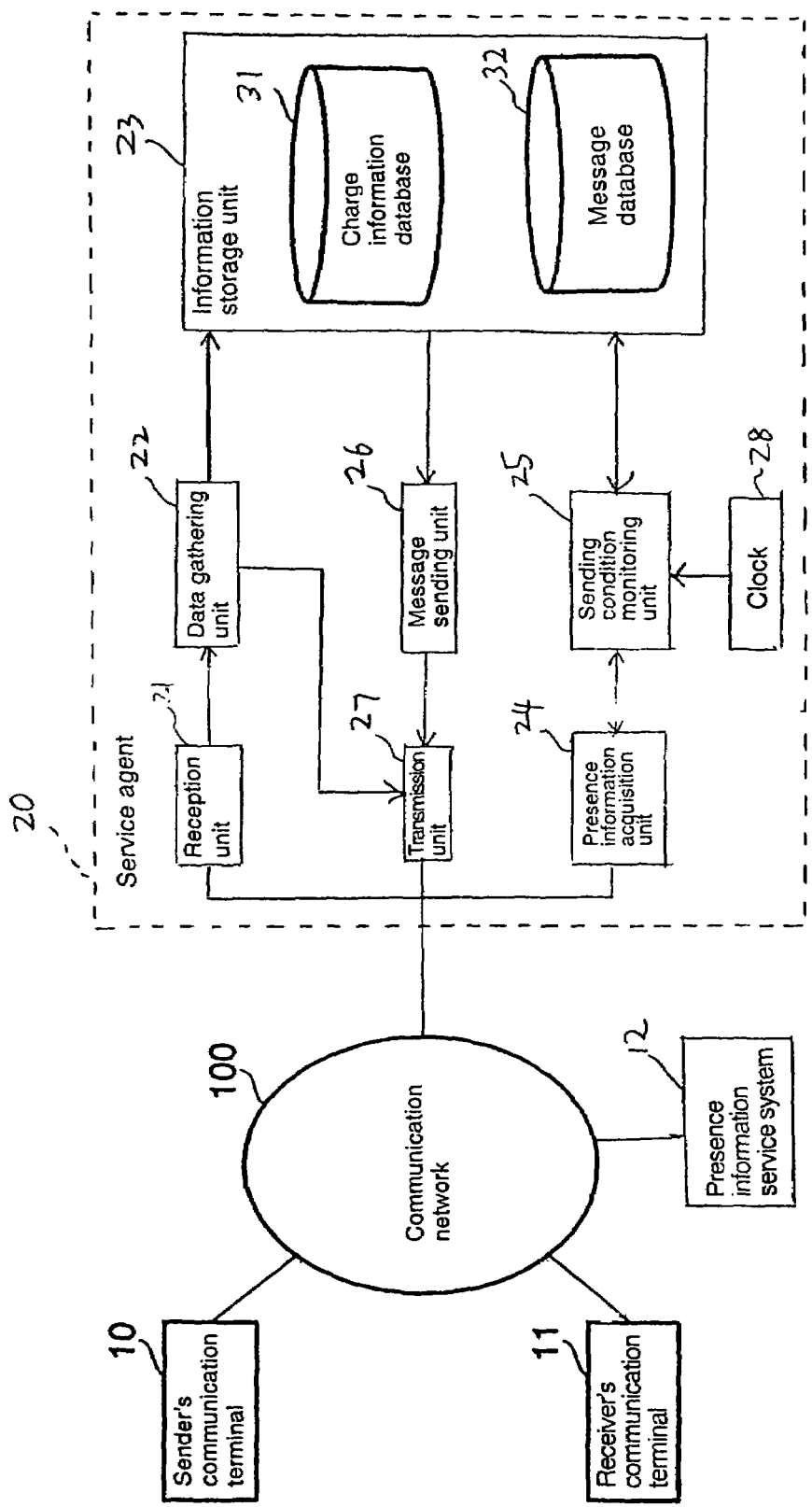
FIG. 1 is a schematic view of the configuration of a service system of an embodiment of the present invention.

The present invention provides a service system for, when a sender is to convey a message by means of a telephone or email to a receiver by way of a communication network, executing processes for setting the message and the sending conditions for this message and then sending the prescribed message when the prescribed sending conditions have been realized. FIG. 1 is a block diagram showing the configuration of service agent 20 that constitutes the automatic message sending service system according to an embodiment of this type of the present invention.

In FIG. 1, sender's communication terminal 10 and receiver's communication terminal 11 are able to communicate by way of communication network 100. Sender's communication terminal 10 and receiver's communication terminal 11 may be communication devices such as telephone terminals, personal computers that are provided with a network capability, or portable telephone devices. Communication network 100 can include a fixed telephone communication network, a mobile communication network, or the Internet. Sender's communication terminal 10 is provided with at least the capability of transmitting by way of communication network 100 to service agent 20: communication partner information; sending condition information; and a message that is transmitted to the communication partner when the conditions match, they are designated by a user. Here, the communication partner information is ID information that is necessary for sending a message to a communication partner, such as a telephone number for specifying the communication partner. The sending condition information includes the conditions regarding the presence information for specifying a timing for sending a message, and can further include conditions regarding, for example, time information and area information.

Receiver's communication terminal 11 is provided with at least the capability of receiving by way of communication network 100 a message that is transmitted by service agent 20. In addition, presence information service system 12 is connected to communication network 100, and at least the receiver receives a service that is provided by presence information service system 12 by way of receiver's communication terminal 11. In other words, the receiver is able to use receiver's communication terminal 11 to set the receiver's state, which indicates, for example, whether the receiver is at work, and the presence information, which is this set information, is stored in a storage device of presence information service system 12 and is rewritten as appropriate when the receiver changes the setting. Users that receive the same presence information service as this receiver are able to receive the presence information of this receiver at any time from presence information service system 12 by way of the communication network 100, and are thus able to check the state of the receiver in real time. The presence information may also include position information of receiver's communication terminal 11 that is obtained by using a position acquisition capability of receiver's communication terminal 11 such as a GPS, and in such cases, the presence information can be rewritten automatically without the need for operation by the receiver to change settings.

Service agent 20 is realized by an information processing device such as a work station server that is used by the service provider and that is provided with a computer that can execute processing such as prescribed operations and control in accordance with a program. This service agent 20 is also able to communicate with sender's communication terminal 10 and receiver's communication terminal 11 by way of communication network 100, and for this communication includes reception unit 21 and transmission unit 27. Reception unit 21 is connected to data gathering unit 22 that collects information such as communication partner information, sending conditions, and messages that have been sent in by way of sender's communication terminal 10 and that stores necessary information in information storage unit 23. In other words, from the information that has been acquired, data gathering unit 22 generates user's information for making charges, registers the generated information in charge information database 31 of information storage unit 23, extracts messages and sending condition information, and registers the extracted information in message database 32. When necessary, data gathering unit 22 may further have the capability of sending to sender's communication terminal 10 by way of transmission unit 27 messages for prompting the transmission of necessary information.

Service agent 20 further includes sending condition monitoring unit 25 for judging, in accordance with sending condition information that is stored in information storage unit 23, whether the conditions have been met or not. Sending condition monitoring unit 25 is connected to presence information acquisition unit 24, which acquires, by way of communication network 100, the presence information that is necessary for judging whether the sending conditions have been satisfied. In addition, the sending conditions may include time conditions, and for these conditions, clock 28 may be connected to sending condition monitoring unit 25.

Sending condition monitoring unit 25 sends a "send message" instruction to message sending unit 26 when the sending conditions have been satisfied. Message sending unit 26 sends the message and the communication partner information that is stored in information storage unit 23 to transmission unit 27 in accordance with the instruction of sending condition monitoring unit 25. Transmission unit 27 thus sends a message by way of communication network 100 to receiver's communication terminal 11.

The user's fees for this service can be demanded and cleared based on user information that is accumulated by the service provider in charge information database 31, or through the use of a fee collection service such as the "Dial Q2" service.

Figure 2:
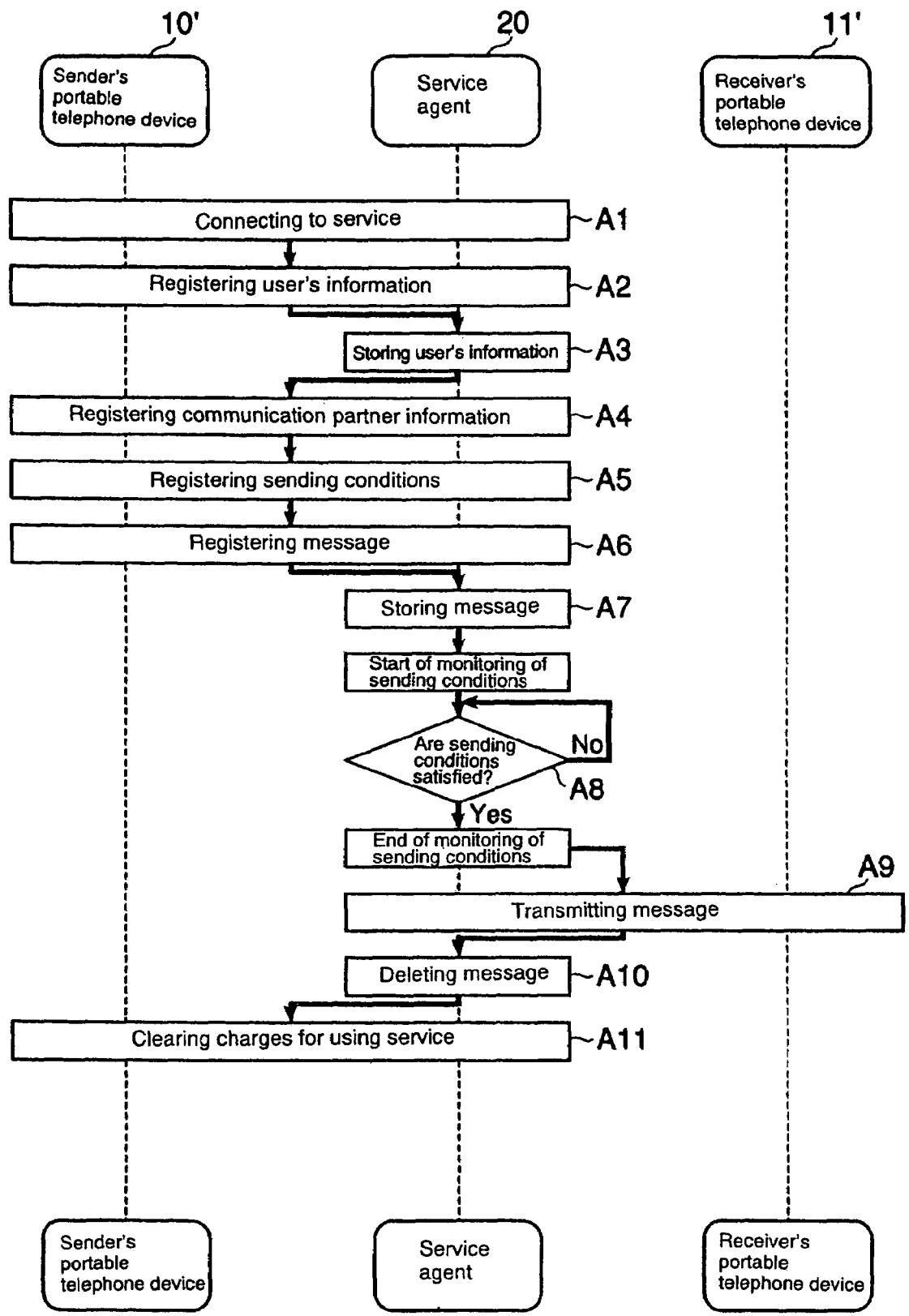
FIG. 2 is a flow chart showing a first example of the operation of the service system of FIG. 1.

Referring now to the flow chart of FIG. 2, explanation next regards a first example of the operation that represents a specific example of message transmission that uses service agent 20. In this example, a case is shown in which sender's portable telephone device 10' and receiver's portable telephone device 11' are used as sender's communication terminal 10 and receiver's communication terminal 11, respectively, and accordingly, communication network 100 is a mobile communication network.

In the present operation example, a case is shown in which a sender wishes to report to a communication partner that a meeting set for the morning of the next day has changed. However, because it is currently in the middle of the night, the sender is scruple to directly telephone and therefore uses service agent 20 of the present embodiment. In this case, the communication partner discloses presence information on communication network 100 to acquaintances that include the sender, and this presence information can be set by selecting, for example, "at work," "private," or "asleep." When the sender checks the presence information of the communication partner, he or she finds that it is currently set to "asleep."

To use the service of the present embodiment, the user first uses his or her own portable telephone device 10' to dial the service connection number that has been set up by the service provider on communication network 100 and thus connects to service agent 20 (Step A1).

Upon connecting to service agent 20, the user is first requested by service agent 20 to enter user's information, whereupon the user registers user's information in service agent 20 (Step A2). This input of information can be executed by voice or by the operation of buttons of sender's portable telephone device 10'. Service agent 20 next stores the user's information that has been received in charge information database 31 (Step A3).

The user is next requested by service agent 20 to enter communication partner information, and the user similarly registers communication partner information in service agent 20 by voice or by the operation of the buttons of portable telephone device 10' (Step A4). As the communication partner information in this example, the user registers the dial-up number of receiver's portable telephone device 11', or if necessary, enters ID information for obtaining permission to consult the presence information of the communication partner. The user is next requested by service agent 20 to enter the sending conditions, and the user accordingly registers sending conditions in service agent 20 by voice or through the operation of the buttons of portable telephone device 10' (Step A5). In this example, the sender registers the condition "When the presence information is not 'Asleep'" as the sending conditions in order that a message be sent when the communication partner gets up the following morning.

The user is next requested by service agent 20 to enter a message, and the user registers a message in service agent 20 by voice or through the operation of the buttons of portable telephone device 10' (Step A6). In this example, the user selects "voice message" as the message type, and the registration of the message is realized by means of direct speech. The content of the message is "Good morning. The meeting set for 9:00 this morning has been changed to 10:00. Please confirm." Service agent 20 then stores the message that has been received in message database 32 (Step A7).

The registration operations are thus completed, and service agent 20 subsequently begins to monitor the sending conditions (Step A8). In other words, in this example, service agent 20 refers to the presence information and watches for a change to a state other than "asleep."

When the sending conditions have been satisfied, or in this case, when service agent 20 verifies that the presence information of the communication partner has changed from "asleep" to, for example, "private," service agent 20 dials the telephone number of the communication partner, connects to receiver's portable telephone device 11', and transmits the message that has been stored in message database 32 (Step A9). When the transmission of this message is completed, service agent 20 deletes the message that is stored in message database 32 and thus completes the message sending process (Step A10). The charges for using this service are requested and cleared by the service provider based on user's information that has been stored in charge information database 31. The processing for requesting and clearing charges for using the service may be executed by electronic settlement between service agent 20 and the communication terminal that is owned by the user (Step A11).

As can be seen from the above-described operation example, by using the system of the present embodiment to set appropriate sending conditions, a sender can send a message at a time that is appropriate to the state of the communication partner without requiring the sender himself or herself to learn or monitor the state of a communication partner.

The above-described operation example is only an example of the present invention, and various modifications are possible within the scope of the present invention. For example, when service agent 20 is able to obtain user's information from a constituent system of communication network 100, the process for registering the user's information (Step A2) may be omitted. In addition, the registration of each item of information, i.e., user's information, communication partner information, sending conditions, and messages, from sender's portable telephone device 10' to service agent 20 (Step A2-Step A7) may be executed by another method. As an example of such a method, a method may be considered in which service agent 20 distributes information for displaying on a sender's portable telephone device 10' an interface screen for the batch input of each item of information to sender's portable telephone device 10' by way of communication network 100 when the user connects to the service. In such a case, the user enters each item of information by voice or through the operation of the buttons of sender's portable telephone device 10' while referring to this interface screen, following which the user can send the necessary information as a batch to service agent 20 by way of communication network 100. Alternatively, the sender may also forgo the use of a communication terminal and instead request the transmission of the message at, for example, a service window, in which case an operator enters the necessary information.

Figure 3:
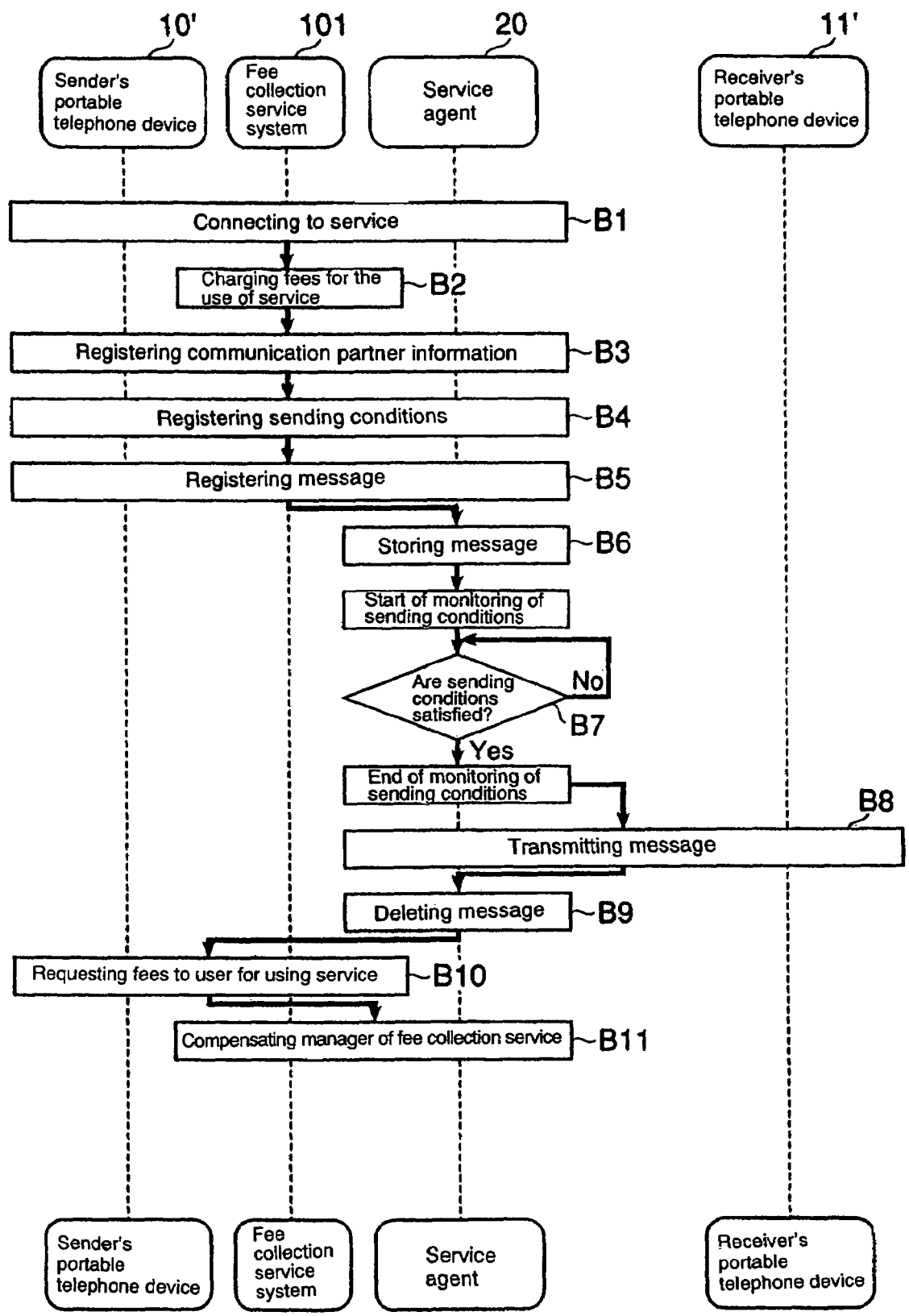
FIG. 3 is a flow chart showing a second example of the operation of the services system of FIG. 1.

Explanation next regards the second example of operation with reference to FIG. 3. This example of operation differs from the first example of operation in that the processes for requesting and clearing the charges for using the service are executed by using a fee collection service system 101 such as the "Dial Q2" service (the name of a service that is offered by NTT East and NTT West) that is contained in a constituent system of communication network 100.

Accordingly, the service provider contracts with a fee collection service that is offered on communication network 100 and sets up service connection numbers on lines that use the fee collection service.

In this example of operation, the user uses sender's portable telephone device 10' to dial the service connection number that has been set up on a line that uses the fee collection service and connects to service agent 20 (Step B1), whereby fee collection service system 101 charges fees for the use of the service by the user (Step B2). Accordingly, the process of registering the user's information is not required in this example of operation.

The subsequent registration of communication partner information, the sending conditions, and the message (Steps B3-B6) and each of the operations for monitoring the sending conditions and sending the message (Steps B7-B9) are the same as the operations of the first example of operation (Steps A4-A10).

In this example of operation, the processes for requesting and clearing fees to the user for using the service are executed by the manager of fee collection service system 101 together with the processes for, for example, requesting and clearing telephone charges (Step B10). In addition, the service provider of the example of operation collects fees for service through the manager of fee collection service system 101 and compensates the manager of fee collection service system 101 based on a contract (Step B11).

As described in the foregoing explanation, the present example of operation is capable of an automatic message sending process that is similar to that of the first example of operation, and in the processes for requesting and clearing charges for the use of the service in the present embodiment, can use either the method of using charge information database 31 or the method of using an already existing fee collection service as appropriate depending on the situation.

Figure 4:
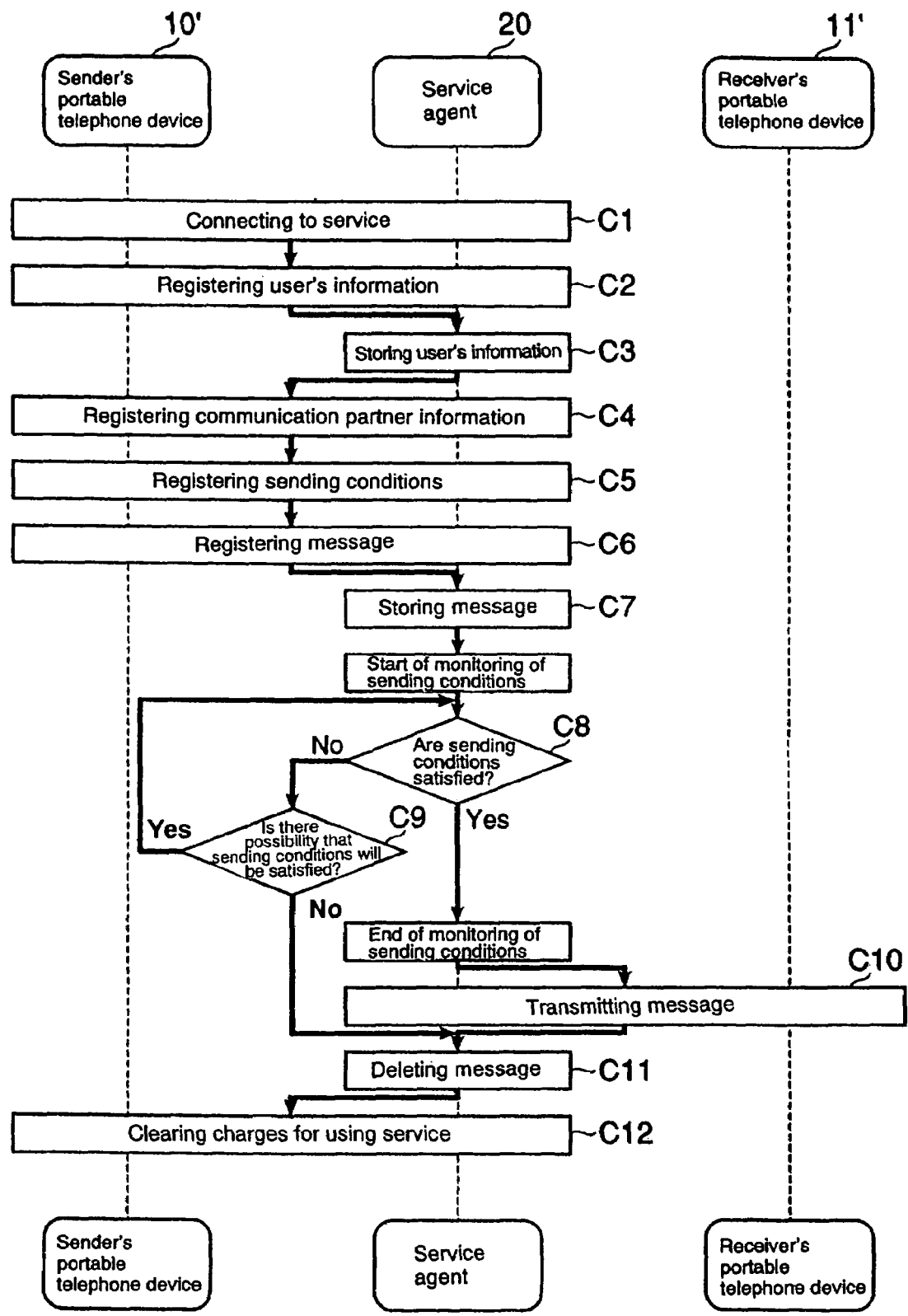
FIG. 4 is a flow chart showing a third example of the operation of the service system of FIG. 1.

Referring now to FIG. 4, the third example of operation is next explained. In this example of operation, a case is described in which composite conditions are set as the sending conditions.

As an example of performing this type of setting, a case is taken in which a user uses service agent 20 because the user wishes to invite a communication partner to go out but is scruple to immediately make a private telephone call because the communication partner is now at work. At the same time, the user wishes to avoid the inconvenience of waiting to telephone when the communication partner finishes work while the user is engaged in some other activity. More specifically, it is now 6:00 pm and the user wishes to pass on a message inviting the communication partner out if the communication partner can finish work by 8:00 pm. The user therefore uses service agent 20 of the present embodiment. In this case, the communication partner discloses presence information on communication network 100 to acquaintances that include the sender, and "private" and "at work" can be selected and set as this presence information. When the sender checks the presence information of the communication partner, he or she finds that the presence information is currently set to "at work."

In this example of operation, the user first uses sender's portable telephone device 10' to connect to service agent 20 by way of communication network 100. The succeeding operations in which the user, in response to requests from service agent 20, registers to service agent 20 the user's information, communication partner information, sending conditions, and the message that is to be sent (Steps C1-C7), are the same as the operations (Steps A1-A7) of the first example of operation.

In the present example of operation, the user here enters, as the sending conditions, composite conditions in which the time is "from the current time until today at 8:00 pm," and moreover, in which the presence information of the communication partner is "private." Still further, as the message, the user enters: "Won't you join me tonight? I'll be at the Diogenes Club in Kabuki-cho until 8:30 pm."

Upon completion of the registration process, service agent 20 begins monitoring the sending conditions. In other words, in this example of operation, service agent 20 checks the current time that is obtained by means of a clock function (clock 28) against the sending condition "today from 6:00 pm to 8:00 pm," and further, monitors the change to "private" of the presence information of the communication partner that is obtained by the function for referring to presence information (presence information acquisition unit 24) (Step C8). Then, when both the time condition and the presence information condition of the sending conditions are satisfied, i.e., when it is determined that the presence information of the communication partner has changed to "private" before 8:00 pm, service agent 20 dials the telephone number of the communication partner, connects to receiver's portable telephone device 11', transmits the message that has been stored in message database 32 (Step C10), and then deletes the message (Step C11).

On the other hand, it is also possible in this example of operation that the communication partner will not finish work until after 8:00 pm and the sending conditions will not be satisfied. In such a case, service agent 20 (sending condition monitoring unit 25) judges whether there is no longer any possibility that the sending conditions will be satisfied, i.e., judges whether 8:00 pm has passed without the presence information of the communication partner becoming "private" (Step C9), and if there is no longer any possibility that the sending conditions will be satisfied, skips Step C10 for sending the message and deletes the message (Step C11).

In this example of operation as well, the process of clearing the charges for use (Step C12) may be executed as in the first example of operation or may be executed as in the second example of operation.

As can be seen from the above-described example of operation, by setting composite conditions, the user can send a message to the communication partner at a desired time with greater specificity and precision. In this case, when there is no longer any possibility that the sending conditions will be satisfied, service agent 20 automatically deletes the registered message, whereby the pointless occupation of the storage area of message database 32, and further, the continuation of a pointless monitoring process by service agent 20 can be avoided. Accordingly, after completing the necessary registration, the user and the service provider no longer need manage transmission. If, as the sending conditions, sending within a specific time interval is entered as an essential condition, the execution of this type of automatic message deletion can be brought about when the specified time interval has passed.

On the other hand, if there is no condition stipulating transmission within a specific time interval among the sending conditions, service agent 20 may, by way of sender's portable telephone device 10' at the time of registration, call the user's attention to the possibility that the conditions will not be met over a long time interval. Alternatively, when monitoring continuously over a long time interval, service agent 20 may, after a prescribed time interval, delete the registration or transmit a message alerting the user to the user's communication terminal such as sender's portable telephone device 10'. The time interval until this type of alert message is sent or the time interval preceding automatic deletion of a message registration may be set in advance, or can be set by the user within a prescribed range in service agent 20.

Figure 5:
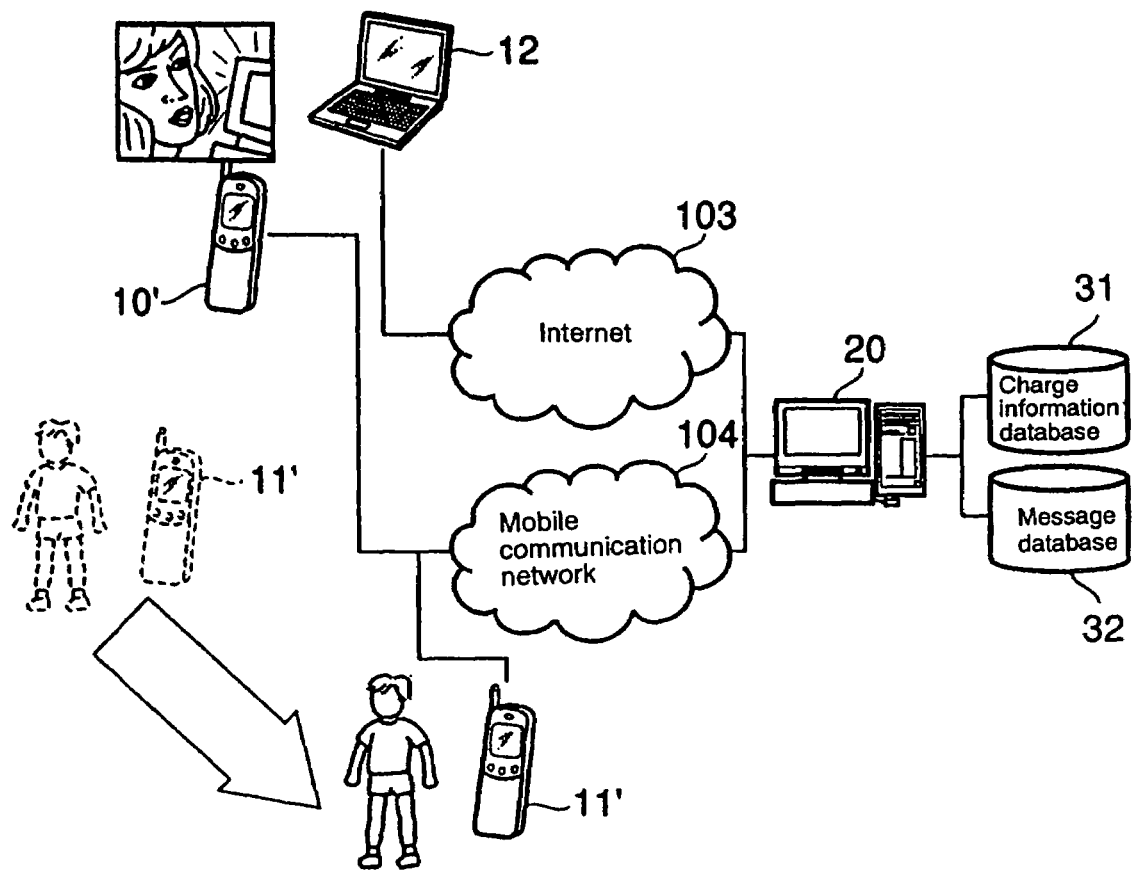
FIG. 5 is a block diagram showing the device relating to a fourth example of operation.
Figure 6:
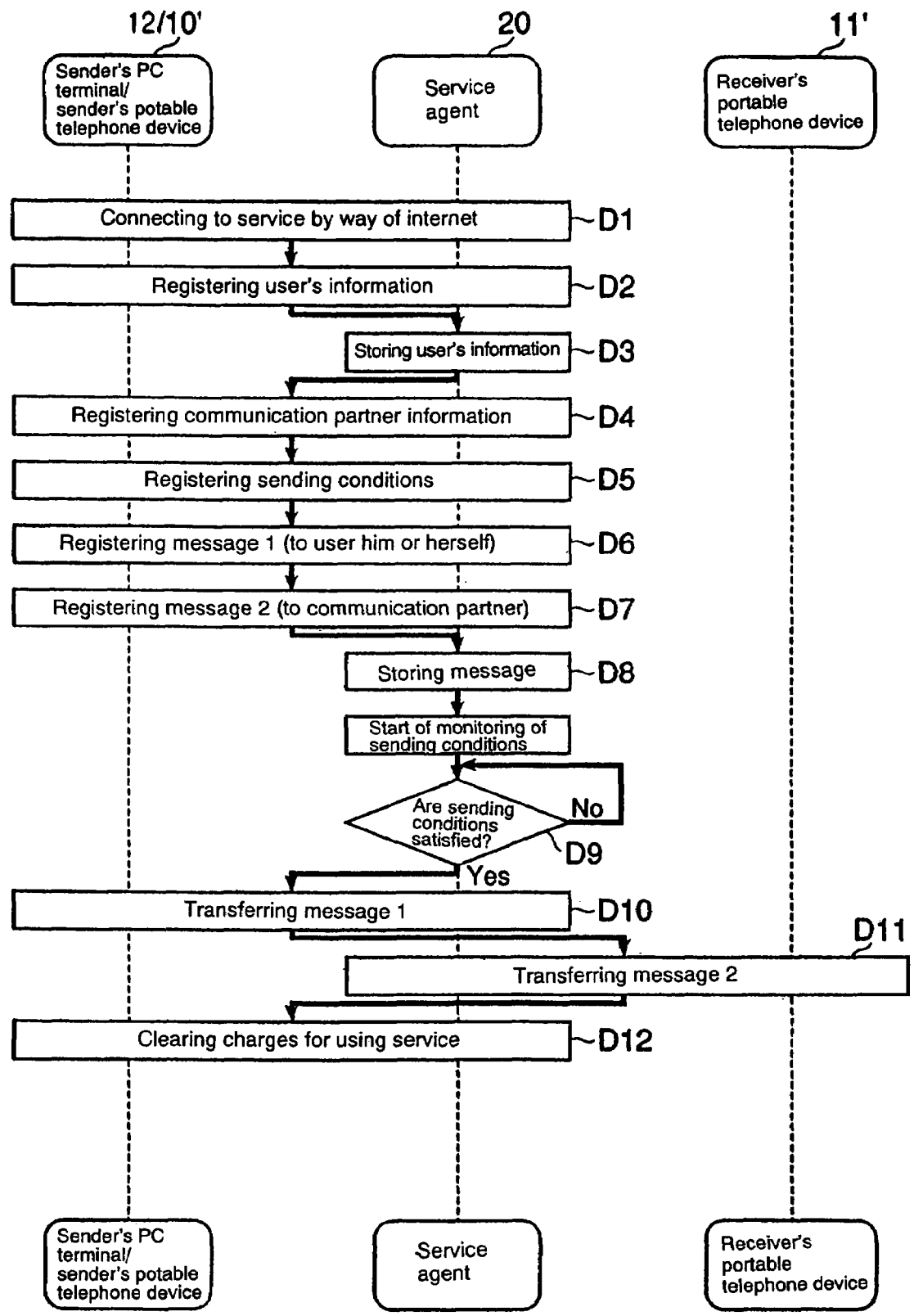
FIG. 6 is a flow chart showing a fourth example of the operation of the service system of FIG. 1.

Explanation next regards the fourth example of operation with reference to FIGS. 5 and 6. FIG. 5 is a block diagram showing each of the devices relating to this example of operation, and FIG. 6 is a flow chart of the operations. In this example of operation, a case is taken in which a mother wants to know if her young child, who is on the way to school, has strayed from the route to school, and in particular, if the child has approached a dangerous area. However, it is difficult to constantly monitor position by means of receiver's portable telephone device 11' that the child carries, and the mother therefore takes advantage of service agent 20 of the present embodiment.

This example of operation differs from the first example of operation in that: a plurality of different networks are used as communication network 100, this example of operation in particular using Internet 103 and mobile communication network 104; the composite conditions of time and area are used as the sending conditions; a plurality of messages all prompted by same sending conditions are sent to a plurality of communication terminals; and the registered messages are not deleted after the messages have been sent.

In this example of operation, the mother, who is the user of the service, carries her own sender's portable telephone device 10' and has her child carry receiver's portable telephone device 11'. The child, who is the communication partner, discloses his or her own position information as presence information on mobile communication network 104 by means of receiver's portable telephone device 11'. Service agent 20 has the capability of acquiring presence information that includes the position information of receiver's portable telephone device 11'. Service agent 20 also has a clock function (clock 28) that can acquire the current time.

The mother first uses sender's PC terminal 12 and designates the Internet address that has been set up on Internet 103 by the service provider to connect by way of Internet 103 to service agent 20 on the Internet 103 (Step D1).

Upon connecting, service agent 20 requests the input of user's information, and the mother registers her user's information to service agent 20 by means of input from sender's PC terminal 12 (Step D2). Service agent 20 then stores the received user's information in charge information database 31 (Step D3). In response to the request for input of communication partner information from service agent 20, the mother next enters to service agent 20 the dial number of receiver's portable telephone device 11' that is the terminal that is the actual object of monitoring, by means of input from sender's PC terminal 12 (Step D4). In addition, the mother also enters the email address of her own sender's portable telephone device 10' as communication partner information.

Next, in response to the request for input of sending conditions from service agent 20, the mother registers the sending conditions to service agent 20 by means of input from PC terminal 12 (Step D5). As the sending conditions in this example of operation, the mother sets the composite conditions: a condition for the time of the commute to school "Every week Monday through Friday from 7:30 am to 8:30 am"; and a condition regarding the position information that is contained in the presence information. As conditions relating to the position information, the mother here registers area information for areas such as the home neighborhood, the route to school, and the school, into which the child, and therefore receiver's portable telephone device 11' that is the terminal that is the actual object of monitoring, may enter without ordinarily raising problems. The mother then enters areas other than the entered areas as the condition.

In accordance with the request for message input from service agent 20, the mother next both registers to service agent 20 the text message "Our dear child might be in danger! Check!" as a message by means of input from PC terminal 12 and sets sender's portable telephone device 10' that she carries as the transmission destination. Further, the mother both enters to service agent 20 the voice message "Don't go anywhere dangerous! Return immediately!" as another message by means of input from PC terminal 12 and sets receiver's portable telephone device 11' that her child carries as the transmission destination (Step D7). Service agent 20 stores the received messages in message database 32 (Step D8).

Upon completion of the above-described registration process, service agent 20 begins monitoring the sending conditions (Step D9). Then, when service agent 20 detects that the sending conditions have been met, i.e., when service agent 20 detects that receiver's portable telephone device 11' has left the designated areas within the set school commute time, service agent 20 sends the plurality of messages that have been entered to each of the transmission destinations (Steps D10 and D11).

The billing and clearing of charges for using this service are implemented by the service provider based on the user's information that has been stored in charge information database 31 (Step D11).

In this example of operation, the deletion of messages following message transmission as in the previously described examples of operation is not performed, and monitoring is executed for each school commute time that has been designated until the term of contract is completed or until the contract is canceled.

As can be seen from the above-described example of operation, the service provided by service agent 20 of the present embodiment can be used as an alarm generation mechanism for reporting the occurrence of conditions that have been designated in various activities of daily life.

While preferred embodiments of the present invention have been described using specific terms, such description is for illustrative purposes only, and it is to be understood that changes and variations may be made without departing from the spirit or scope of the following claims.

What is claimed is:

1. An automatic message sending method for automatically sending computer messages that have been registered in said computer by a sender by way of a communication network to communication terminals that have been registered in said computer by said sender when sending conditions that have been registered by said sender in said computer have been satisfied;

wherein said sending conditions include a condition in which presence information of a recipient that can always be obtained by way of a communication network through said communication terminals that have been registered in said computer by said sender attains a prescribed state;

said method comprising the steps of:

acquiring said presence information by way of a communication network;

referring to said presence information that has been acquired to monitor said presence information to determine whether said sending conditions have been met;

automatically sending said messages when said sending conditions have been satisfied;

judging whether there is no longer a possibility that said sending conditions will be satisfied; and when there is no longer a possibility that said sending conditions will be satisfied, deleting the registration of said messages.

2. An automatic message sending method according to claim 1, further comprising the step of acquiring by way of a communication network and from the communication terminal of said sender: said messages, said sending conditions, and information of said communication terminal to which said message is to be sent.

3. An automatic message sending method according to claim 1, wherein said sending conditions are composite conditions that are a plurality of conditions.

4. An automatic message sending method according to claim 1, wherein a plurality of communication terminals can be registered as the communication terminals to which said messages are to be sent.

5. An automatic message sending method according to claim 1, further comprises registering at least one sending condition which includes said condition in which said presence information attains said prescribed state.

6. An automatic message sending method according to claim 1, further comprises registering said messages by storing said messages in a message database.

7. An automatic message sending method according to claim 1, further comprises monitoring said preference information to determine whether said preference information matches a condition satisfying said sending conditions.

8. An automatic message sending method according to claim 7, wherein said preference information is continuously monitored by said computer.

9. An automatic message sending method according to claim 1, further comprises registering at least one sending condition which includes said condition in which said presence information attains said prescribed state; and
monitoring said preference information to determine whether said preference information matches a condition satisfying said sending conditions.

10. An automatic message sending method according to claim 1, wherein said messages are electronic messages registered by said sender to be sent to said recipient upon satisfying said sending conditions corresponding directly to a unique state of said recipient based on said preference information and said sending conditions are prescribed by said sender to match said unique state of said recipient.

11. An automatic message sending method according to claim 1, wherein said messages are authored by said sender.

12. An automatic message sending method according to claim 1, wherein said presence information includes at least one of a time information, area information and status information, wherein
said time information includes a real time,
said area information includes a location of said recipient based on position information, and
said status condition includes a current state of said recipient.

13. An automatic message sending method according to claim 1, wherein said sending condition includes at least one of a time condition, area condition and status condition according to said presence information, wherein
said time condition includes at least one of a prescribed time interval and a prescribed time,
said area condition includes a prescribed location of said recipient based on said position information, and
said status condition includes a prescribed state of said recipient of a plurality of states.

14. An automatic message sending method according to claim 1, wherein said presence information includes at least one of a time information, area information and status information, wherein
said time information includes a real time,
said area information includes a location of said recipient based on position information, and
said status condition includes a current state of said recipient; and
wherein said sending condition includes at least one of a time condition, area condition and status condition according to said presence information, wherein
said time condition includes at least one of a prescribed time interval and a prescribed time,
said area condition includes a prescribed location of said recipient based on said position information, and
said status condition includes a prescribed state of said recipient of a plurality of states.

15. An automatic message sending method according to claim 1, wherein it is judged that there is no longer the possibility that said sending conditions will be satisfied when said preference information attains a state which can no longer satisfy an essential condition of said sending conditions.

16. An automatic message sending method according to claim 1, wherein said judging whether there is no longer a possibility that said sending conditions will be satisfied is based on said monitoring of said presence information.

17. An automatic message sending method according to claim 1, wherein said message is deleted automatically by said computer.

18. An automatic message sending service system for automatically sending messages that have been registered by a sender by way of a communication network to communication terminals that have been registered by said sender when sending conditions that have been registered by said sender have been satisfied;
wherein said sending conditions include a condition in which presence information of a recipient that can always be obtained by way of a communication network by way of said communication terminals that have been registered in a computer by said sender attains a prescribed state;
said system comprising:
a transmission unit for transmitting data by way of a communication network;
an information storage unit for storing said messages and said sending conditions that have been registered by said sender;
a presence information acquisition unit for acquiring by way of a communication network said presence information that is necessary depending on said sending conditions that are stored in said information storage unit;
a sending condition monitoring unit for referring to said presence information that has been acquired by said presence information acquisition unit and monitoring said presence information to determine whether said sending conditions that have been stored in said information storage unit have been satisfied; and
a message sending unit for automatically sending by way of said transmission unit said messages that have been stored in said information storage unit to said communication terminals that have been entered by said sender when it is determined by said sending condition monitoring unit that said sending conditions have been satisfied,
wherein the sending condition monitoring unit judges whether there is no longer a possibility that said sending conditions will be satisfied, and when there is no longer a possibility that said sending conditions will be satisfied, deletes the registration of said messages.

* * * * *